(12) United States Patent
Norvell et al.

(10) Patent No.: US 11,417,348 B2
(45) Date of Patent: Aug. 16, 2022

(54) TRUNCATEABLE PREDICTIVE CODING

(71) Applicant: Telefonaktiebolaget LM Ericsson (publ), Stockholm (SE)

(72) Inventors: Erik Norvell, Upplands Väsby (SE); Fredrik Jansson, Sundbyberg (SE)

(73) Assignee: TELEFONAKTIEBOLAGET LM ERISSON (PUBL), Stockholm (SE)

( * ) Notice: Subject to any disclaimer, the term of this patent is extended or adjusted under 35 U.S.C. 154(b) by 5 days.

(21) Appl. No.: 17/044,732

(22) PCT Filed: Apr. 5, 2019

(86) PCT No.: PCT/EP2019/058681
§ 371 (c)(1),
(2) Date: Oct. 1, 2020

(87) PCT Pub. No.: WO2019/193173
PCT Pub. Date: Oct. 10, 2019

(65) Prior Publication Data
US 2021/0158825 A1    May 27, 2021

Related U.S. Application Data

(60) Provisional application No. 62/652,949, filed on Apr. 5, 2018, provisional application No. 62/652,941, filed
(Continued)

(51) Int. Cl.
*G10L 19/012* (2013.01)
*G10L 19/008* (2013.01)
(Continued)

(52) U.S. Cl.
CPC .......... *G10L 19/012* (2013.01); *G10L 19/008* (2013.01); *G10L 19/0017* (2013.01);
(Continued)

(58) Field of Classification Search
None
See application file for complete search history.

(56) References Cited

U.S. PATENT DOCUMENTS 9,865,274 B1 *   1/2018  Vicinus ................. H04R 5/027
2011/0082700 A1  4/2011  Myburg et al.
(Continued)

FOREIGN PATENT DOCUMENTS

WO       2015/122809 A1    8/2015

OTHER PUBLICATIONS

International Search Report and Written Opinion issued in International Application No. PCT/EP2019/058681 dated Aug. 1, 2019 (21 pages).
(Continued)

*Primary Examiner* — Shaun Roberts
(74) *Attorney, Agent, or Firm* — Rothwell, Figg, Ernst & Manbeck, P.C.

(57) ABSTRACT

A method, system, and computer program to encode and decode a channel coherence parameter applied on a frequency band basis, where the coherence parameters of each frequency band form a coherence vector. The coherence vector is encoded and decoded using a predictive scheme followed by a variable bit rate entropy coding.

26 Claims, 11 Drawing Sheets

Related U.S. Application Data on Apr. 5, 2018, provisional application No. 62/653,078, filed on Apr. 5, 2018.

(51) Int. Cl.

| | | |
|---|---|---|
| *G10L 19/032* | (2013.01) | |
| *G10L 19/04* | (2013.01) | |
| *G10L 19/06* | (2013.01) | |
| *G10L 19/00* | (2013.01) | |
| *H04W 76/28* | (2018.01) | |

(52) U.S. Cl.
CPC ............ *G10L 19/032* (2013.01); *G10L 19/04* (2013.01); *G10L 19/06* (2013.01); *H04W 76/28* (2018.02)

(56) References Cited

U.S. PATENT DOCUMENTS

| | | | |
|---|---|---|---|
| 2011/0150227 A1 | 6/2011 | Kim | |
| 2011/0182168 A1 | 7/2011 | LeBlanc | |
| 2011/0249822 A1* | 10/2011 | Jaillet | G10L 19/008 381/22 |
| 2012/0029925 A1* | 2/2012 | Duni | G10L 25/90 704/500 |
| 2013/0197919 A1* | 8/2013 | Li | G10L 19/24 704/500 |
| 2014/0019145 A1 | 1/2014 | Moriya et al. | |
| 2014/0321652 A1* | 10/2014 | Schuijers | H04S 5/00 381/17 |
| 2015/0187366 A1* | 7/2015 | Moriya | H03M 7/3059 704/206 |
| 2016/0035357 A1* | 2/2016 | Vasilache | H04S 3/008 381/23 |
| 2016/0322058 A1 | 11/2016 | Grancharov et al. | |
| 2017/0047072 A1* | 2/2017 | Eriksson | G10L 19/008 |
| 2017/0142412 A1 | 5/2017 | Fuchs et al. | |
| 2018/0061428 A1* | 3/2018 | Seroussi | G10L 19/002 |
| 2018/0240471 A1* | 8/2018 | Markovich Golan | G10L 21/0364 |

OTHER PUBLICATIONS

Kazuhito Koishida et al., "A 16-KBIT/S Bandwith Scalable Audio Coder Based on the G.729 Standard", IEEE International Conference, vol. 2, Piscataway, NJ Jun. 2000 (pp. 1149-1152).

Saikat Chatterjee et al., "Comparison of Prediction Based LSF Quantization Methods using Split VQ", Interspeech 2016—ICSLP, vols. 1-5, Sep. 2006 (pp. 237-240).

C.-C. Kuo et al., "New LSP encoding method based on two-dimensional linear prediction", IEEE Proceedings, vol. 140, No. 6, Dec. 1993 (pp. 415-419).

J. Here et al., "The Reference Model Architecture for MPEG Spatial Audio Coding", Audio Engineering Society Convention Paper, New York, NY, May 2005 (pp. 1-13).

* cited by examiner

TRUNCATEABLE PREDICTIVE CODING

CROSS REFERENCE TO RELATED APPLICATION(S)

This application is a 35 U.S.C. § 371 National Stage of International Patent Application No. PCT/EP2019/058681, filed Apr. 5, 2019, designating the United States and claiming priority to the following three U.S. provisional patent applications: 1) U.S. provisional patent application no. 62/652,941, filed on Apr. 5, 2018; 2) U.S. provisional patent application no. 62/652,949, filed on Apr. 5, 2018; and 3) U.S. provisional patent application no. 62/653,078, filed on Apr. 5, 2018. Each one of the above identified applications is hereby incorporated by reference.

TECHNICAL FIELD

Disclosed are embodiments related to predictive encoding and decoding related generally to audio signal processing.

BACKGROUND

Although the capacity in telecommunication networks is continuously increasing, it is still of great interest to limit the required bandwidth per communication channel. Less transmission bandwidth for each call allows the mobile network to service a larger number of users in parallel. Additionally, lowering the transmission bandwidth yields lower power consumption in both a mobile device and a base station of the mobile network. Such lower power consumption results in energy and cost saving for a mobile operator, while an end user may experience prolonged battery life and increased talk-time.

One method for reducing transmission bandwidth in speech communication is to utilize the natural pauses in speech. In most conversations, only one talker is active at a time and the natural pauses in speech by the talker in one direction will typically occupy more than half of the signal. A method of utilizing this property of a typical conversation for the purpose of decreasing transmission bandwidth is to employ a Discontinuous Transmission (DTX) scheme where active signal coding is discontinued during speech pauses. DTX schemes are standardized for all 3GPP mobile telephony standards such as 2G, 3G and VoLTE. DTX schemes are also commonly used in Voice over IP systems.

When implementing a DTX scheme, it is common to transmit a very low bit rate encoding of the background noise to allow a Comfort Noise Generator (CNG) at the receiving end to fill speech pauses with a generated background noise having similar characteristics to the original background noise. The CNG makes the call sound more natural as the generated background noise is not switched on and off with the speech according to the DTX scheme. Complete silence during speech pauses is perceived as annoying to a listener and often leads to the misconception that the call has been disconnected.

The DTX scheme further relies on a Voice Activity Detector (VAD) which indicates to the system when to use active signal encoding methods or low rate background noise encoding methods. The system may be generalized to discriminate between other source types by using a Generic Sound Activity Detector (GSAD also referred to as SAD), which not only discriminates speech from background noise, but also detects music or other relevant signal types.

Communication services may be further enhanced by supporting stereo or multichannel audio transmission. In such instances, a DTX and CNG system may need to consider the spatial characteristics of the audio signal in order to provide a pleasant sounding comfort noise.

SUMMARY

Telecommunication traditionally utilizes a single channel for voice communication where a single microphone at each communication endpoint is used to capture the sounds uttered by a speaker. Accordingly, there is a need to enhance the communication experience by providing a more precise reconstruction of the spatial environment of the speaker. Such enhancements may increase the intelligibility of the speech as it is easier to separate a voice from the background noise if they are separated in a spatial manner. Further, it is beneficial to have speakers separated in an audio space for a teleconference scenario with more than two participants.

A common comfort noise (CN) generation method used in 3GPP speech codecs is to transmit information to a receiver regarding the energy and spectral shape of the background noise for the speech pauses. Information regarding background noise can be transmitted using a significantly less number of bits compared to regular coding of speech segments.

At the receiver end, the CN is generated by creating a pseudo random signal and shaping the spectrum of the created signal with a filter based on the received information regarding the background noise for the speech pauses. Such signal generation and spectral shaping can be done in the time domain or the frequency domain.

Conventional methods of CN generation for a stereo DTX system use a mono encoder with a DTX system working separately on each channel. For example, a dual mono encoding is used for a dual channel stereo DTX system. Accordingly, the energy and spectral shape of the background noise transmitted to the receiver can be different for the left signal and the right signal. In most cases the difference in energy and spectral shape of the transmitted background noise between the left signal and the right signal may not be large, such differences may result in a significant difference in how "wide" the stereo image of the signal is perceived by a listener. That is, if the pseudo random signals used to generate the CN is synchronized between the left and the right channel the result will be a stereo signal which sounds very "narrow," thereby giving the sensation of a sound originating from within the head of the listener. In contrast, if the pseudo random signals are not synchronized, the very opposite sensation would be given to the listener, i.e. a wide signal.

In most cases, an original background noise will have an energy and spectral shape, also referred to as a stereo image, that is in-between these two extremes, i.e. the narrow signal and the wide signal. This results in a detectable difference in the stereo image of the background noise when the system switches between active (speech) and non-active (noise) coding.

The stereo image of the original background noise may also change during a call. For example, a user may be moving around and/or the environment surrounding the user may be changing. Conventional methods of CN generation, such as a dual mono encoding system, fail to provide any mechanisms to adapt to such changes.

Another disadvantage of using conventional methods of CN generation, such as dual mono encoding, is that the VAD decision will not be synchronized between the channels. This may lead to audible artifacts when, for example, a left channel is encoded with active coding and a right channel is encoded with the low bit rate CN coding. The lack of synchronization of the VAD decision between the channels may cause the pseudo random signals used to generate the CN in the left and the right channel to be synchronized in some time instances and the unsynchronized in others. As a result, the stereo image of the generated CN may toggle between extremely wide and extremely narrow over time.

As shown above, there remains a need for an improved method of CN generation.

Accordingly, certain embodiments disclosed herein provide a method to encode a channel coherence parameter applied on a frequency band basis, where the coherence parameters of each band form a coherence vector. The coherence vector is encoded using a predictive scheme followed by a variable bit rate entropy coding. The coding scheme further improves the performance through an adaptive inter-frame prediction.

For instance, in one aspect there is provided a method performed by an encoder to encode a vector. The method includes the encoder forming a prediction weighting factor. For each element of the vector, the encoder forms a first prediction of the vector element and a second prediction of the vector element. The encoder combines said first prediction and said second prediction using the prediction weighting factor into a combined prediction. The encoder forms a prediction residual using said vector element and said combined prediction. The encoder encodes the prediction residual with a variable bit rate scheme. The encoder transmits the encoded prediction residual. In some embodiments, said vector is one of a sequence of vectors. In some embodiments, the encoder reconstructs the vector based on the combined prediction and a reconstructed prediction residual. In some embodiments, the encoder encodes and transmits the prediction weighting factor.

In some embodiments, the first prediction is an intra-frame prediction based on the reconstructed vector elements. In such embodiments, the intra-frame prediction is formed by performing a process which includes selecting a predictor from a set of predictors, applying the selected predictor to the reconstructed vector elements; and encoding an index corresponding to the selected predictor.

In some embodiments, the second prediction is an inter-frame prediction based on one or more vectors previously reconstructed for the sequence of vectors. In such embodiments, the inter-frame prediction is formed by performing a process which may include selecting a predictor from a set of predictors, applying the selected predictor to the one or more previously reconstructed vectors, and encoding an index corresponding to the selected predictor. In some embodiments, a value from the previous reconstructed vector is used for the inter-frame prediction.

In some embodiments, the encoder quantizes the prediction residual to form a first residual quantizer index, wherein the first residual quantizer index is associated with a first code word.

In some embodiments, the step of encoding the prediction residual with the variable bit rate scheme includes encoding the first residual quantizer index as a result of determining that the length of the first code word does not exceed the amount of remaining bits.

In some embodiments, the step of encoding the prediction residual with the variable bit rate scheme includes obtaining a second residual quantizer index as a result of determining that the length of the first code word exceeds the amount of remaining bits, wherein the second residual quantizer index is associated with a second code word, and wherein the length of the second code word is shorter than the length of the first code word. In such embodiments, the encoder determines whether the length of the second code word exceeds the determined amount of remaining bits.

In some embodiments, the encoder is further configured to receive a first signal on a first input channel, receive a second signal on a second input channel, determine spectral characteristics of the first signal and the second signal, determine a spatial coherence based on the determined spectral characteristics of the first signal and the second signal, and determine the vector based on the spatial coherence.

In some embodiments, the method is performed by the encoder in an audio encoder and decoder system comprising at least two input channels. In some embodiments, the encoder is further configured to create a spectrum by performing a process comprising transforming the input channels and analyzing the input channels in frequency bands. In some embodiments, the vector comprises a set of coherence values, and wherein each value corresponds to the coherence between two of the at least two input channels in a frequency band.

In another aspect there is provided a method performed by a decoder to decode a vector. The method includes the decoder obtaining a weighting factor. For each element of the vector the decoder forms a first prediction of the vector and a second prediction of the vector. The decoder combines said first prediction and said second prediction using the prediction weighting factor into a combined prediction. The decoder decodes a received encoded prediction residual. The decoder reconstructs the vector element based on the combined prediction and the decoded prediction residual. In some embodiments, said vector is one of a sequence of vectors.

In some embodiments, the first prediction is an intra-frame prediction based on the reconstructed vector elements. In such embodiments, the intra-frame prediction is formed by performing a process which includes receiving and decoding a predictor and applying the decoded predictor to the reconstructed vector elements.

In some embodiments, the second prediction is an inter-frame prediction based on one or more vectors previously reconstructed for the sequence of vectors. In such embodiments, the inter-frame prediction is formed by performing a process which may include receiving and decoding a predictor; and applying the decoded predictor to the one or more previously reconstructed vectors. In some embodiments, a value from previous reconstructed vector is used for the inter-frame prediction.

In some embodiments, the step of decoding the encoded prediction residual includes determining an amount of remaining bits available for decoding and determining whether decoding the encoded prediction residual exceeds the amount of remaining bits.

In some embodiments, the step of decoding the encoded prediction residual includes setting the prediction residual as zero as a result of determining that decoding the encoded prediction residual exceeds the amount of remaining bits.

In some embodiments, the step of decoding the encoded prediction residual includes deriving the prediction residual based on a residual quantizer index as a result of determining that decoding the encoded prediction residual does not exceed the amount of remaining bits, wherein the residual quantizer index is a quantization of the prediction residual.

In some embodiments, the step of obtaining the prediction weighting factor comprises (i) deriving the prediction weighting factor or (ii) receiving and decoding the prediction weighting factor.

In some embodiments, the decoder generates signals for at least two output channels based on the reconstructed vector.

In yet another aspect there is provided an encoder comprising a processing circuitry. The processing circuitry is configured to cause the encoder to form a weighting factor, form a first prediction of a vector element, form a second prediction of the vector element, and to combine said first prediction and said second prediction using the prediction weighting factor into a combined prediction. The processing circuitry is further configured to cause the encoder to form a prediction residual using said vector element and said combined prediction, encode the prediction residual with a variable bit rate scheme and transmit the encoded prediction residual.

In yet another aspect there is provided a decoder comprising a processing circuitry. The processing circuitry being configured to cause the decoder to obtain a weighting factor, form a first prediction of a vector element, form a second prediction of the vector element and to combine said first prediction and said second prediction using the prediction weighting factor into a combined prediction. The processing circuitry is further configured to cause the decoder to decode a received encoded prediction residual and reconstruct the vector element based on the combined prediction and the decoded prediction residual.

The embodiments disclosed herein provide prediction and residual coding which offers rate scalability suitable for the variable bit budget. The residual coding may be truncated in relation to the predictive scheme. The adaptive inter-frame prediction finds a balance between the advantages of inter-frame redundancy while minimizing the risk of error propagation in case of frame loss.

BRIEF DESCRIPTION OF THE DRAWINGS

The accompanying drawings, which are incorporated herein and form part of the specification, illustrate various embodiments.

DETAILED DESCRIPTION

Figure 1:
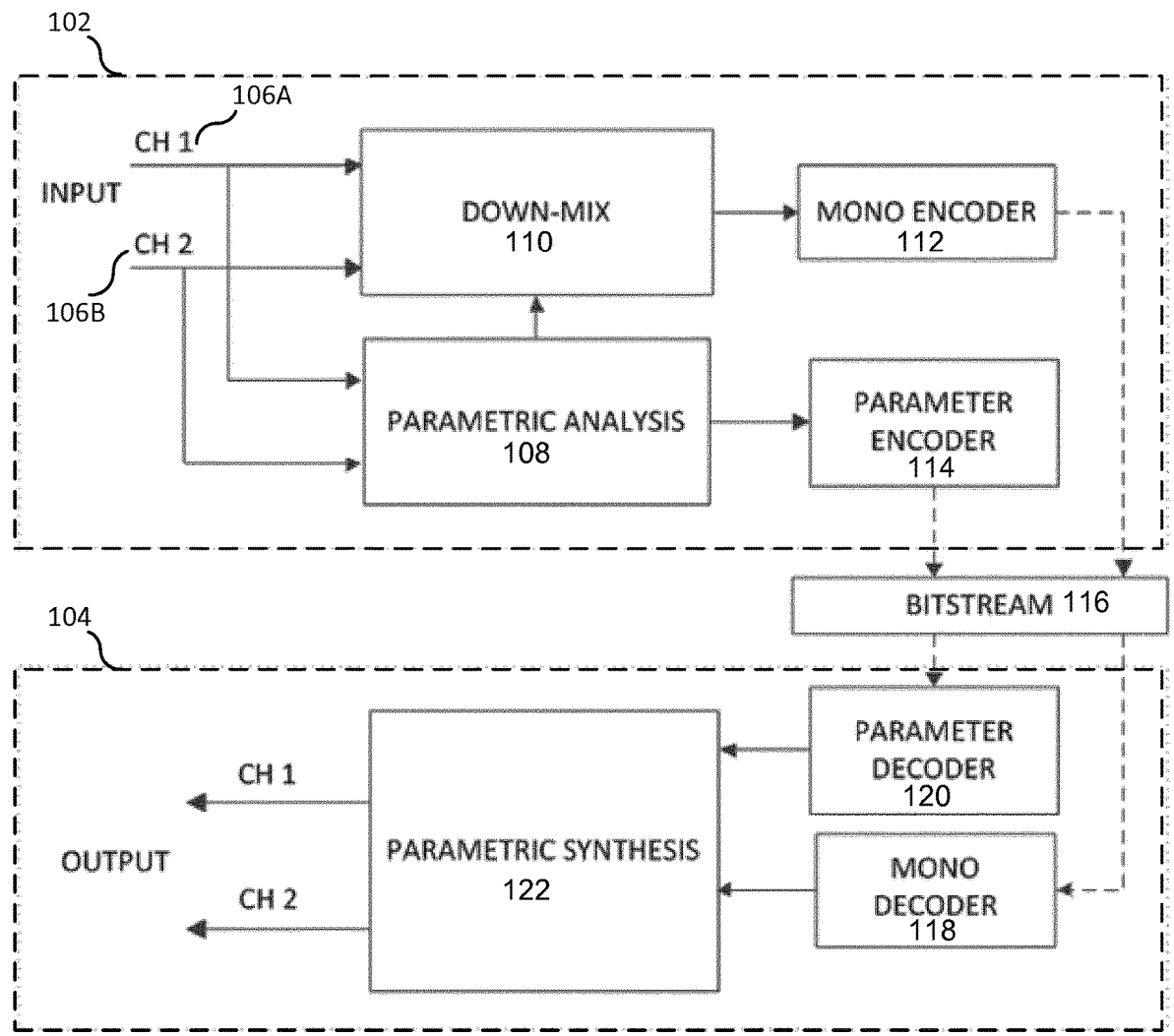
FIG. 1 illustrates a stereo encoding and decoding system according to some embodiments.

A method of achieving a spatial representation of a signal is to use multiple microphones and to encode a stereo or multichannel signal. FIG. 1 shows an illustration of a parametric stereo encoder 102 and decoder 104. The encoder 102 performs an analysis of the input channel pair 106A-106B and obtains a parametric representation of a stereo image through parametric analysis 108 and reduces the channels a single channel through down-mix 110 thereby obtaining a down-mixed signal. The down-mixed signal is encoded with a mono encoding algorithm by a mono encoder 112 and the parametric representation of the stereo image is encoded by a parameter encoder 114. The encoded down-mixed signal and parametric representation of the stereo image is transmitted through a bitstream 116. The decoder 104 employs a mono decoder 118 to apply a mono decoding algorithm and obtains a synthesized down-mixed signal. A parameter decoder 120 decodes the received parametric representation of the stereo image. The decoder 104 transforms the synthesized down-mix signal into a synthesized channel pair through parametric synthesis 122 using the decoded parametric representation of the stereo image.

Figure 2:
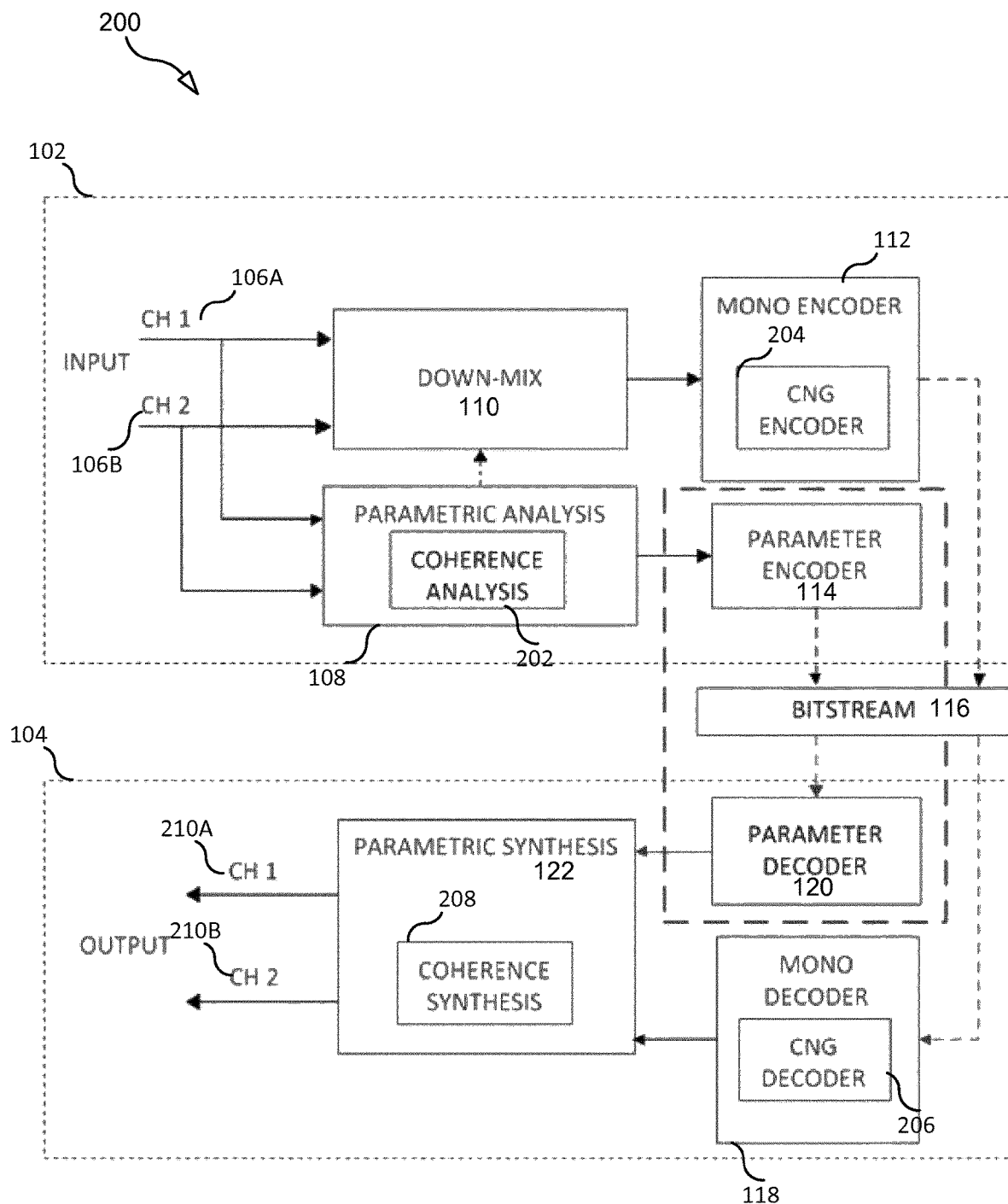
FIG. 2 illustrates a stereo encoding and decoding system according to some embodiments.

FIG. 2 illustrates a parametric stereo encoding and decoding system 200 according to some embodiments. As shown in FIG. 2, the parametric stereo encoding and decoding system 200 comprises a mono encoder 112 including a CNG encoder 204 and a mono decoder 118 including a CNG decoder 206. In some embodiments, the input signals 106A-106B comprise a channel pair denoted as [l(m,n) r(m,n)], where l(m,n) and r(m,n) denote the input signals for the left and right channel, respectively, for sample index n of frame m. The signals are processed in frames of length N samples at a sampling frequency $F_s$, where the length of the frame may include an overlap such as look-ahead and memory of past samples.

The parametric stereo encoding and decoding system 200 further comprises a coherence analysis 202 in the parametric analysis 108 and a coherence synthesis 208 in the parametric synthesis 122. The parametric analysis 108 includes the capability to analyze the coherence of the input signals 106A-106B. The parametric analysis 108 may analyze the input signals 106A-106B when the mono encoder 112 is configured to operate as the CNG encoder 204. In some embodiments, the input signals 106A-106B may be transformed to the frequency domain by means of, for example, a DFT or any other suitable filter-bank or transform such as QMF, hybrid QMF, and MDCT. In some embodiments, a DFT or MDCT transform may be used to transform the input signals 106A-106B to the frequency domain. In such embodiments, the input signals 106A-106B are typically windowed before the transformation. The choice of window depends on various parameters, such as time and frequency resolution characteristics, algorithmic delay (overlap length), reconstruction properties, etc. As an example, the DFT transformed channel pair denoted as [l(m,n) r(m,n)] is given by $$[L(m, k)R(m, k)] = [DFT(l_{win}(m, n))DFT(r_{win}(m, n))],$$

$$\begin{cases} n = 0, 1, 2, \ldots, N-1 \\ k = 0, 1, 2, \ldots, N-1 \\ m = 0, 1, 2, \ldots \end{cases}$$

A general definition of the channel coherence $C_{gen}(f)$ for frequency f is given by $$C_{gen}(f) = \frac{|S_{xy}(f)|^2}{S_{xx}(f)S_{yy}(f)},$$

where $S_{xx}(f)$ and $S_{yy}(f)$ represent the power spectra of the two channels 106A-106B and $S_{xy}(f)$ is the cross power spectrum. In the exemplary DFT based solution, the channel coherence spectra may be represented by the DFT spectra given by $$C(k, m) = \frac{|L(m, k)R(m, k)^*|^2}{|L(m, k)|^2 |R(m, k)|^2}$$

where * denotes the complex conjugate. To reduce the number of bits required to encode the coherence values, the spectrum is divided into sub frequency bands (also referred to as coherence bands). In some embodiments, the bandwidth of the sub frequency bands is configured to match the perceived frequency resolution with narrow bandwidth for the low frequencies and increasing bandwidth for higher frequencies. It is to be noted that terms channel coherence and spatial coherence are used interchangeably throughout the description.

Accordingly, the analysis of the coherence provides a value per sub frequency band, thereby forming a vector of coherence values, $C_m = [C_{1,m}\ C_{2,m} \ldots C_{b,m} \ldots C_{N_{bnd},m}]$, where $N_{bnd}$ is the number of coherence bands, b is the band index, and m is the frame index. The coherence values $C_{b,m}$ are then encoded to be stored or transmitted to a decoder. In some embodiments, the power spectra may be averaged over time or low-pass filtered to form more stable estimates of the power spectrum. Further details regarding the coherence analysis is described in International Application Publication No. WO 2015/122809.

When decoding a CNG frame, the decoder 104 produces two CNG frames corresponding to the two synthesis channels 210A-210B. In some embodiments, the two CNG frames are generated to have a minimum coherence/correlation. Such CNG frames with minimum coherence/correlation may be generated by operating the CNG decoder 206 two separate times with the same parameters, but using two different pseudo-random number generators according to some embodiments. In some embodiments, the two CNG frames with minimum coherence/correlation may be generated by applying a decorrelator function which modifies the fine structure of the CNG frame while maintaining a minimum impact on the magnitude spectrum. The target coherence is then obtained by combining the two generated CNG signals using a method described in International Application Publication No. WO 2015/122809.

The proposed solution disclosed herein applies to a stereo encoder and decoder architecture or a multi-channel encoder and decoder where the channel coherence is considered in channel pairs. Referring back to FIG. 2, the mono encoder 112 may comprise a stereo encoder VAD according to some embodiments. The stereo encoder VAD may indicate to the CNG encoder 204 that a signal contains background noise, thereby activating the CNG encoder 204. Accordingly, a CNG analysis comprising the coherence analysis 202 is activated in the parametric analysis 108 and the mono encoder 112 initiates the CNG encoder 204. As a result, an encoded representation of the coherence and the mono CNG is bundled together in the bitstream 116 for transmission and/or storing. The decoder 104 identifies the stereo CNG frame in the bitstream 116, decodes the mono CNG and the coherence values, and synthesizes the target coherence as described, for instance, in International Application Publication No. WO 2015/122809.

The disclosed embodiments described herein relate to the encoding and decoding of the coherence values for the CNG frames.

The encoding of the coherence vector described herein considers the following properties: (1) adaptable encoding to a varying per-frame bit budget $B_m$, (2) the coherence vector shows strong frame-to-frame similarity, and (3) error propagation should be kept low for lost frames.

To address the varying per-frame bit budget, a coarse-fine encoding strategy is implemented. More specifically, the coarse encoding is first achieved at a low bit rate and the subsequent fine encoding may be truncated when the bit limit is reached.

In some embodiments, the coarse encoding is performed utilizing a predictive scheme. In such embodiments, a predictor works along the coherence vector for increasing bands b and estimates each coherence value based on the previous values of the vector. That is, an intra-frame prediction of the coherence vector is performed and is given by:

$$C_{intra,b,m}^{(q)} = \begin{cases} 0, & b = 1 \\ \sum_{i=1}^{b-1} p_{b,i}^{(q)} C_{i,m}, & 2 \leq b \leq N_{bnd} \end{cases}$$

Each predictor set P(q) consists of $(N_{bnd}-1)$ predictors, each predictor comprising (b 1) predictor coefficients for each band b where q=1, 2, ... $N_q$ and $N_q$ indicates a total number of predictor sets. As shown above, there are no previous values when b=1 and the intra-frame prediction of the coherence is zero. As an example, a predictor set number q when there are six coherence bands, $N_{bnd}$=6, is given by $$P^{(q)} = \{[p_{2,1}^{(q)}], [p_{3,1}^{(q)} p_{3,2}^{(q)}], [p_{4,1}^{(q)} p_{4,2}^{(q)} p_{4,3}^{(q)}],$$
$$[p_{5,1}^{(q)} p_{5,2}^{(q)} p_{5,3}^{(q)} p_{5,4}^{(q)}], [p_{6,1}^{(q)} p_{6,2}^{(q)} p_{6,3}^{(q)} p_{6,4}^{(q)} p_{6,5}^{(q)}]\}.$$

As another example, the total number of predictor sets may be four, i.e. $N_q$=4, which indicates that the selected predictor set may be signaled using 2 bits. In some embodiments, predictor coefficients for a predictor set q may be addressed sequentially and stored in a single vector of length $\sum_i^{N_{bnd}-1} i = N_{bnd}(N_{bnd}-1)/2$.

Figure 3:
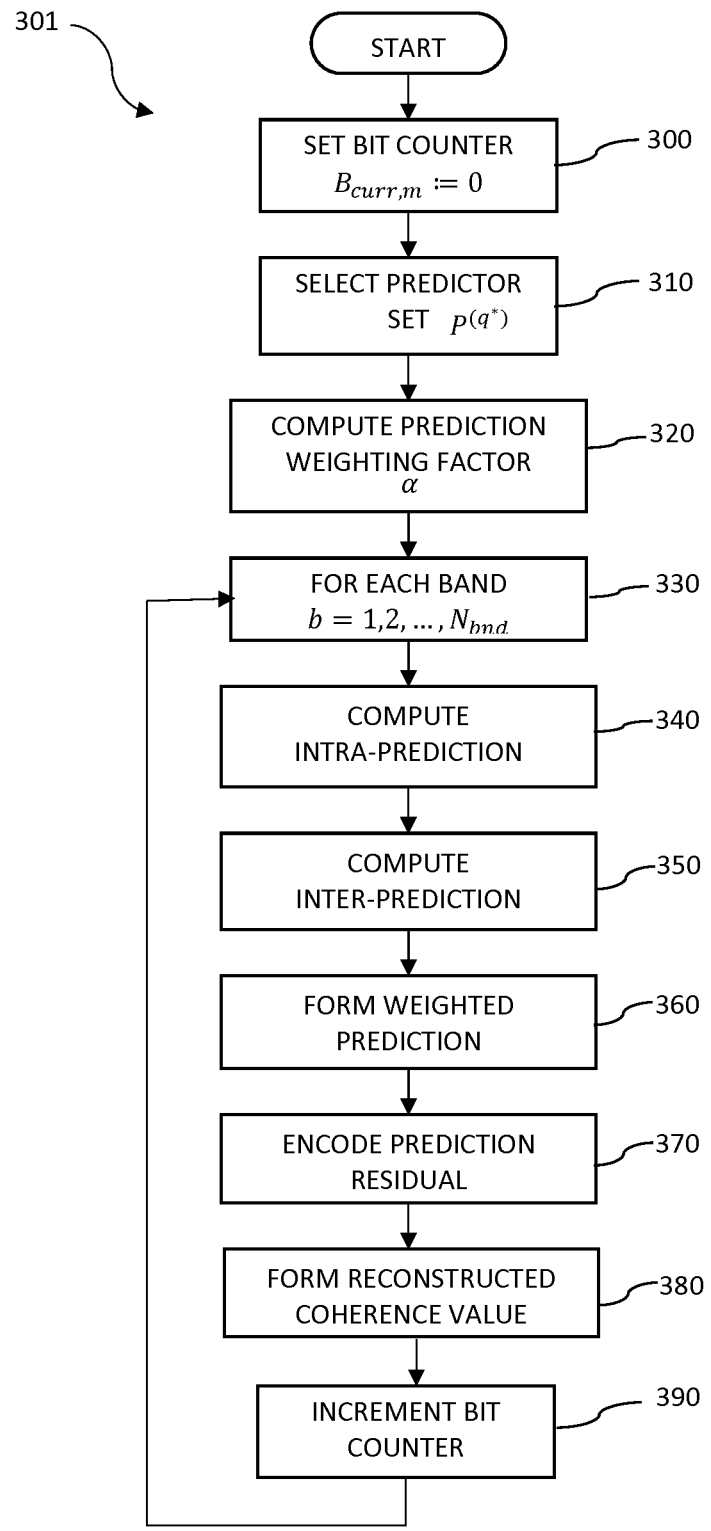
FIG. 3 is a flow chart illustrating an encoding process according to some embodiments.

FIG. 3 is a flow chart illustrating an encoding process 301 according to some embodiments. The encoding process 301 may be performed by the encoder 102 according to the following steps:

In step 300, for each frame m, a bit variable (also referred to as a bit counter) to keep track of the bits spent for the encoding is initialized to zero ($B_{curr,m}$=0). The encoding algorithm receives a coherence vector ($C_{b,m}$) to encode, a copy of the previous reconstructed coherence vector ($\hat{C}_{b,m-1}$), and a bit budget $B_m$. In some embodiments, the bits spent in preceding encoding steps may be included in $B_m$ and $B_{curr,m}$. In such embodiments, the bit budget in the algorithm below can be given by $B_m - B_{curr,m}$.

In step 310, a predictor set $P^{(q^*)}$ which gives the smallest prediction error out of the available predictors $P^{(q)}$, q=1, 2, ..., $N_q$ is selected. The selected predictor set is given by $$q^* = \underset{q'}{\operatorname{argmin}} \sum_{b=2}^{N_{bnd}} \left|C_{intra,b,m}^{(q')} - C_{b,m}\right|^2, q' = 1, 2, \ldots, N_q.$$

In some embodiments, b=1 is omitted from the predictor set because the prediction is zero and contribution to the error will be the same for all predictor sets. The selected predictor set index is stored and the bit counter ($B_{curr,m}$) is increased with the required number of bits, e.g. $B_{curr,m}:=B_{curr,m}+2$ if two bits are required to encode the predictor set.

In step 320, a prediction weighting factor α is computed. The prediction weighting factor is used to create a weighted prediction as described in step 360 below. The prediction weighting factor needs to be available in the decoder 104. In some embodiments, the prediction weighting factor α is encoded and transmitted to the decoder 104. In such embodiments, the bit counter ($B_{curr,m}$) is increased by the amount of bits required for encoding the prediction weighting factor. In other embodiments, the decoder may derive the prediction weight factor based on other parameters already available in the decoder 104.

For each of the bands b=1, 2, . . . $N_{bnd}$ in step 330, the following steps are performed:

In step 340, an intra-frame prediction value, $\hat{C}_{intra,b,m}^{(q)}$, is obtained. There are no preceding encoded coherence values for the first band (b=1). In some embodiments, the intra-frame prediction for the first band may be set to zero, $\hat{C}_{intra,1,m}^{(q)}=0$. In some embodiments, the intra-frame prediction for the first band may be set to an average value $\bar{C}$, $\hat{C}_{intra,1,m}^{(q)}=\bar{C}$.

In some alternative embodiments, the coherence value of the first band may be encoded separately. In such embodiments, the first value is encoded using a scalar quantizer to produce reconstructed value $\hat{C}_{SQ,1,m}$. Accordingly, the intra-frame prediction for the first band may be set to the reconstructed value, $\hat{C}_{intra,1,m}^{(q)}=\hat{C}_{SQ,1,m}$. The bit counter, $B_{curr,m}$, is increased by the amount of bits required to encode the coherence value of the first band. For example, if 3 bits are used to encode the coherence value of the first band, 3 bits are added to the current amount of bits spent for the encoding, for example, $B_{curr,m}:=B_{curr,m}+3$.

For the remaining bands b=2, 3, . . . , $N_{bnd}$, the intra-frame prediction $\hat{C}_{pred,b,m}^{(q)}$ is based on previously encoded coherence values, i.e. $\hat{C}_{intra,b,m}^{(q)}=\sum_{i=1}^{b-1} p_{b,i}^{(q)} \hat{C}_{i,m}$.

In step 350, an inter-frame prediction value, $\hat{C}_{inter,b,m}$, is obtained based on previously reconstructed coherence vector elements from one or more preceding frames. In cases where the background noise is stable or changing slowly, the frame-to-frame variation in the coherence band values $C_{b,m}$ will be small. Hence, an inter-frame prediction using the values from previous frame will often be a good approximation which yields a small prediction residual and a small residual coding bit rate. As an example, a last reconstructed value for band b may be used for an inter-frame prediction value, i.e. $\hat{C}_{inter,b,m}=\hat{C}_{b,m-1}$. An inter-frame linear predictor considering two or more preceding frames can be formulated as $\hat{C}_{inter,m}=\sum_{n=1}^{N_{inter}} g_n \hat{C}_{m-n}$, where $\hat{C}_{inter,m}$ denotes the column vector of inter-frame predicted coherence values for all bands b of frame m, $\hat{C}_{m-n}$ represents the reconstructed coherence values for all bands b of frame m−n and $g_n$ is the linear predictor coefficients which span $N_{inter}$ preceding frames. $g_n$ may be selected out of a pre-defined set of predictors, in which case the used predictor needs to be represented with an index that may be communicated to a decoder.

In step 360, a weighted prediction, $\hat{C}_{pred,b,m}^{(q)}$, is formed based on the intra-frame prediction, $\hat{C}_{intra,b,m}^{(q)}$, the inter-frame prediction, $\hat{C}_{inter,b,m}^{(q)}$, and the prediction weighting factor α. In some embodiments, the weighted prediction is given $\hat{C}_{pred,b,m}^{(q)}=\alpha \hat{C}_{intra,b,m}^{(q)}+(1-\alpha)\hat{C}_{inter,b,m}$.

In step 370, a prediction residual is computed and encoded. In some embodiments, the prediction residual is computed based on the coherence vector and the weighted prediction, i.e. $r_{b,m}=C_{b,m}-\hat{C}_{pred,b,m}^{(q)}$. In some embodiments, a scalar quantizer is used to quantize the prediction residual to an index $I_{b,m}$. In such embodiments, the index is given by $I_{b,m}=SQ(r_{b,m})$ where SQ(x) is a scalar quantizer function with a suitable range. An example of a scalar quantizer is shown in Table 1 below. Table 1 shows an example of reconstruction levels and quantizer indices for a prediction residual.

TABLE 1

| I = SQ(x) | 0 | 1 | 2 | 3 | 4 | 5 | 6 | 7 | 8 |
|---|---|---|---|---|---|---|---|---|---|
| Reconstruction levels | −0.4 | −0.3 | −0.2 | −0.1 | 0 | 0.1 | 0.2 | 0.3 | 0.4 |

Figure 4:
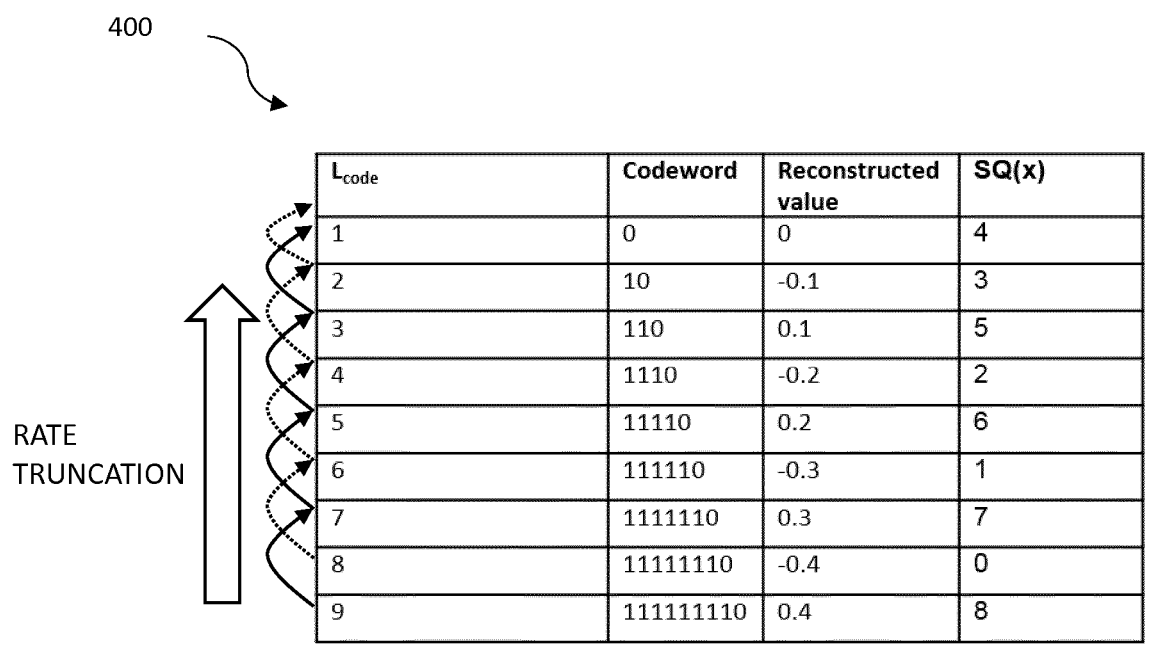
FIG. 4 illustrates a truncation scheme according to some embodiments.

In some embodiments, the index $I_{b,m}$ is encoded with a variable length codeword scheme that consumes fewer bits for smaller values. Some examples for encoding the prediction residual are Huffman coding, Golomb-Rice coding, and unary coding (the unary coding is the same as the Golomb-Rice coding with divisor 1). In the step of encoding the prediction residual, the remaining bit budget ($B_m-B_{curr,m}$) needs to be considered. If the length of the codeword $L_{code}(I_{b,m})$ corresponding to index $I_{b,m}$ fits within the remaining bit budget, i.e. $L_{code}(I_{b,m}) \leq B_m-B_{curr,m}$, the index $I_{b,m}$ is selected as the final index $I_{b,m}^*$. If the remaining bits are not sufficient to encode the index $I_{b,m}$, a bit rate truncation strategy is applied. In some embodiments, the bit rate truncation strategy includes encoding the largest possible residual value, assuming that smaller residual values cost fewer bits. Such a rate truncation strategy can be achieved by reordering a codebook as illustrated by table 400 in FIG. 4. FIG. 4 shows an exemplary quantizer table 400 with unary codeword mapping for the scalar quantizer example shown in Table 1. In some embodiments, a bit rate truncation may be achieved by advancing upwards in the table 400 in steps of two until codeword 0 is reached. That is, FIG. 4 illustrates a truncation scheme of moving upwards from a long code word to a shorter code word. To maintain the correct sign of the reconstructed value, each truncation steps takes two steps up the table 400, as indicated by the dashed and solid arrows for negative and positive values respectively. By moving upward in the table 400 in steps of two, a new truncated codebook index $I_{b,m}^{trunc}$ can be found. The upward search continues until $L_{code}(I_{b,m}^{trunc}) \leq B_m-B_{curr,m}$ is satisfied or the top of the table 400 has been reached.

If the length of the codeword determined by the upward search fits does not exceed bit budget, the final index is selected $I_{b,m}^*=I_{b,m}^{trunc}$ and $I_{b,m}^*$ is output to the bitstream and the reconstructed residual is formed based on the final index, i.e. $\hat{r}_{b,m}=R(I_{b,m}^*)$.

If after the upward search, the length of the codeword still exceeds the bit budget, $L_{cede}(I_{b,m}^{trunc}) > B_m-B_{curr,m}$, this means that the bit limit has been reached $B_m=B_{curr,m}$. In such instances, the reconstructed residual is set to zero $\hat{r}_{b,m}=0$ and an index is not added to the bitstream. Since the decoder keeps a synchronized bit counter, $B_{curr,m}$, the decoder may detect this situation and use $\hat{r}_{b,m}=0$ without explicit signaling.

In an alternative embodiment, if the length of the codeword associated with the initial index exceeds the bit budget, the residual value is immediately set to zero, thereby foregoing the upward search describe above. This could be beneficial if computational complexity is critical.

In step 380, a reconstructed coherence value $\hat{C}_{b,m}$ is formed based on the reconstructed prediction residual and the weighted prediction, i.e. $\hat{C}_{b,m} = \hat{C}_{pred,b,m}^{(q)} + \hat{r}_{b,m}$.

In step 390, the bit counter is incremented accordingly. As described above, the bit counter is increased throughout the encoding process 301.

In some embodiments, the frame-to-frame variations in the coherence vector are small. Hence, the inter-frame prediction using the previous frame value is often a good approximation which yields a small prediction residual and a small residual coding bit rate. Additionally, the prediction weighting factor α serves the purpose of balancing the bit rate versus the frame loss resilience.

Figure 5:
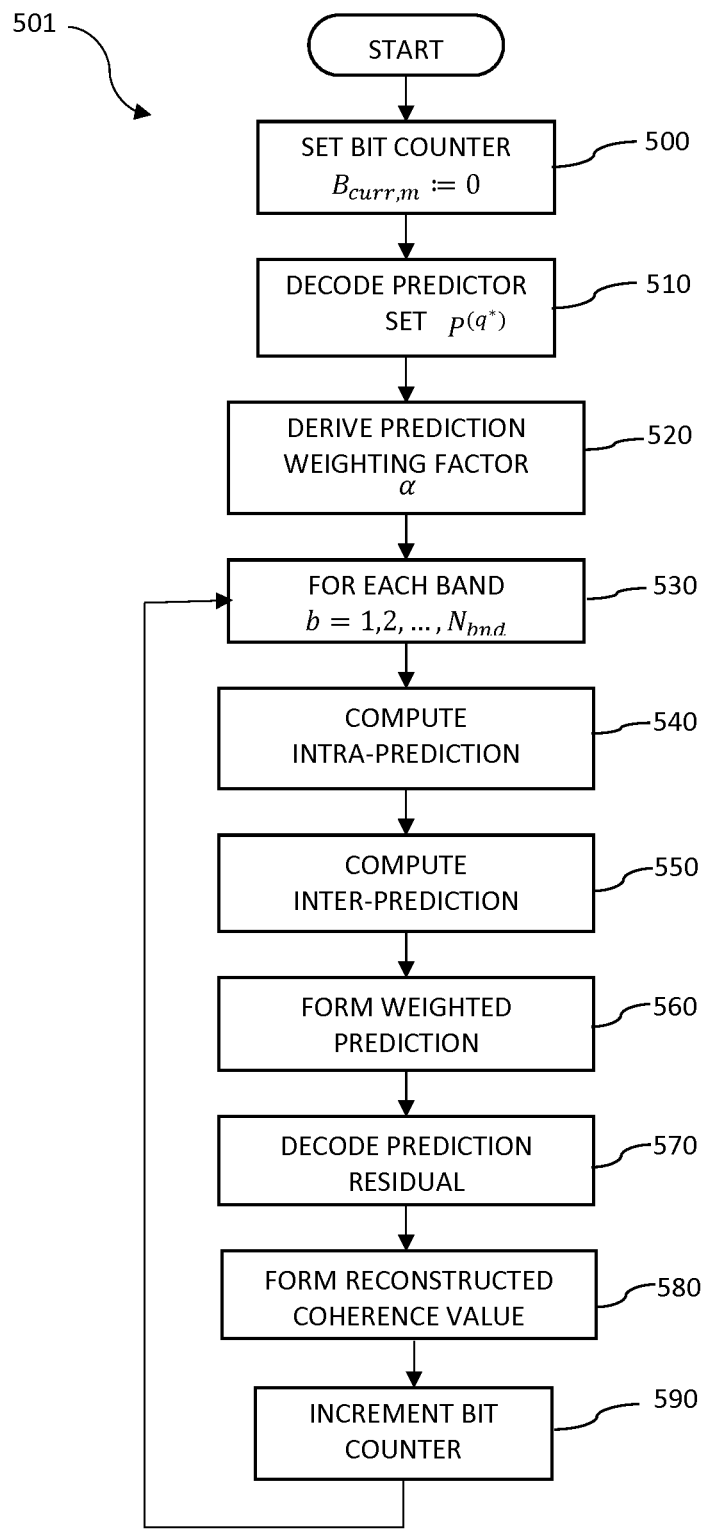
FIG. 5 is a flow chart illustrating a decoding process according to some embodiments.

FIG. 5 is a flow chart illustrating a decoding process 501 according to some embodiments. The decoding process 501 corresponding to the encoding process 301 may be performed by the decoder 104 according to the following steps:

In step 500, a bit counter, $B_{curr,m}$, configured to keep track of the bits spent during the decoding process 501 is initialized to zero, i.e. $B_{curr,m} = 0$. For each frame m, the decoder 104 obtains a copy of the last reconstructed coherence vector $\hat{C}_{b,m-1}$ and a bit budget $B_m$.

In step 510, a selected predictor set $P^{(q^*)}$ is decoded from the bitstream 116. The bit counter is increased by the amount of bits required to decode the selected predictor set. For example, if two bits are required to decode the selected predictor set, the bit counter, $B_{curr,m}$, is increased by two, i.e. $B_{curr,m} := B_{curr,m} + 2$.

In step 520, the prediction weighting factor α corresponding to the weighting factor used in the encoder 102 is derived.

For each of the bands b=1, 2, . . . $N_{bnd}$ in step 530, the following steps are performed:

In step 540, an intra-prediction value, $\hat{C}_{intra,b,m}^{(q)}$, is obtained. The intra-frame prediction for the first band is obtained similarly to step 340 of the encoding process 301. Accordingly, the intra-frame prediction for the first frame may be set to zero ($\hat{C}_{intra,1,m}^{(q)} = 0$), an average value $\overline{C}$ ($\hat{C}_{intra,1,m}^{(q)} = \overline{C}$) or a coherence value of the first band may be decoded from the bitstream 116 and the intra-frame prediction for the first frame may be set to reconstructed value $\hat{C}_{SQ,1,m}$ ($\hat{C}_{intra,1,m}^{(q)} = \hat{C}_{SQ,1,m}$). If the coherence value of the first band is decoded, the bit counter, $B_{curr,m}$, is increased by the amount of bits required for the decoding. For example, if three bits are required for decoding the coherence value of the first band, the bit counter, $B_{curr,m}$, is increased by three, i.e. $B_{curr,m} := B_{curr,m} + 3$.

For the remaining bands b=2, 3, . . . , $N_{bnd}$, the intra-frame prediction $\hat{C}_{pred,b,m}^{(q)}$ is based on the previously decoded coherence values, i.e. $\hat{C}_{intra,b,m}^{(q)} = \sum_{i=1}^{b-1} p_{b,i}^{(q)} \hat{C}_{i,m}$.

In step 550, an inter-frame prediction value, $\hat{C}_{inter,b,m}$, is obtained similarly to step 350 of the encoding process 301. As an example, a last reconstructed value for band b may be used for an inter-frame prediction value, i.e. $\hat{C}_{inter,b,m} = \hat{C}_{b,m-1}$.

In step 560, a weighted prediction, $\hat{C}_{pred,b,m}^{(q)}$, is formed based on the intra-frame prediction, $\hat{C}_{intra,b,m}^{(q)}$, the inter-frame prediction, $\hat{C}_{inter,b,m}$, and the prediction weighting factor α. In some embodiments, the weighted prediction is given by $\hat{C}_{pred,b,m}^{(q)} = \alpha \hat{C}_{intra,b,m}^{(q)} + (1-\alpha)\hat{C}_{inter,b,m}$.

In step 570, a reconstructed prediction residual, $\hat{r}_{b,m}$, is decoded. If the bit counter, $B_{curr,m}$, is below the bit limit, i.e. $B_{curr,m} < B_m$, the reconstructed prediction residual is derived from an available quantizer index $\hat{r}_{b,m} = R(I_{b,m}^*)$. If the bit counter equals or exceeds the bit limit, the reconstructed prediction residual is set to zero, i.e. $\hat{r}_{b,m} = 0$.

In step 580, a coherence value $\hat{C}_{b,m}$ is reconstructed based on the reconstructed prediction residual and the weighted prediction, i.e. $\hat{C}_{b,m} = \hat{C}_{pred,b,m}^{(q)} + \hat{r}_{b,m}$. In step 590, the bit counter is incremented.

In some embodiments, further enhancements of the CNG may be required in the encoder. In such embodiments, a local decoder will be run in the encoder where the reconstructed coherence values $\hat{C}_{b,m}$ are used.

Figure 6:
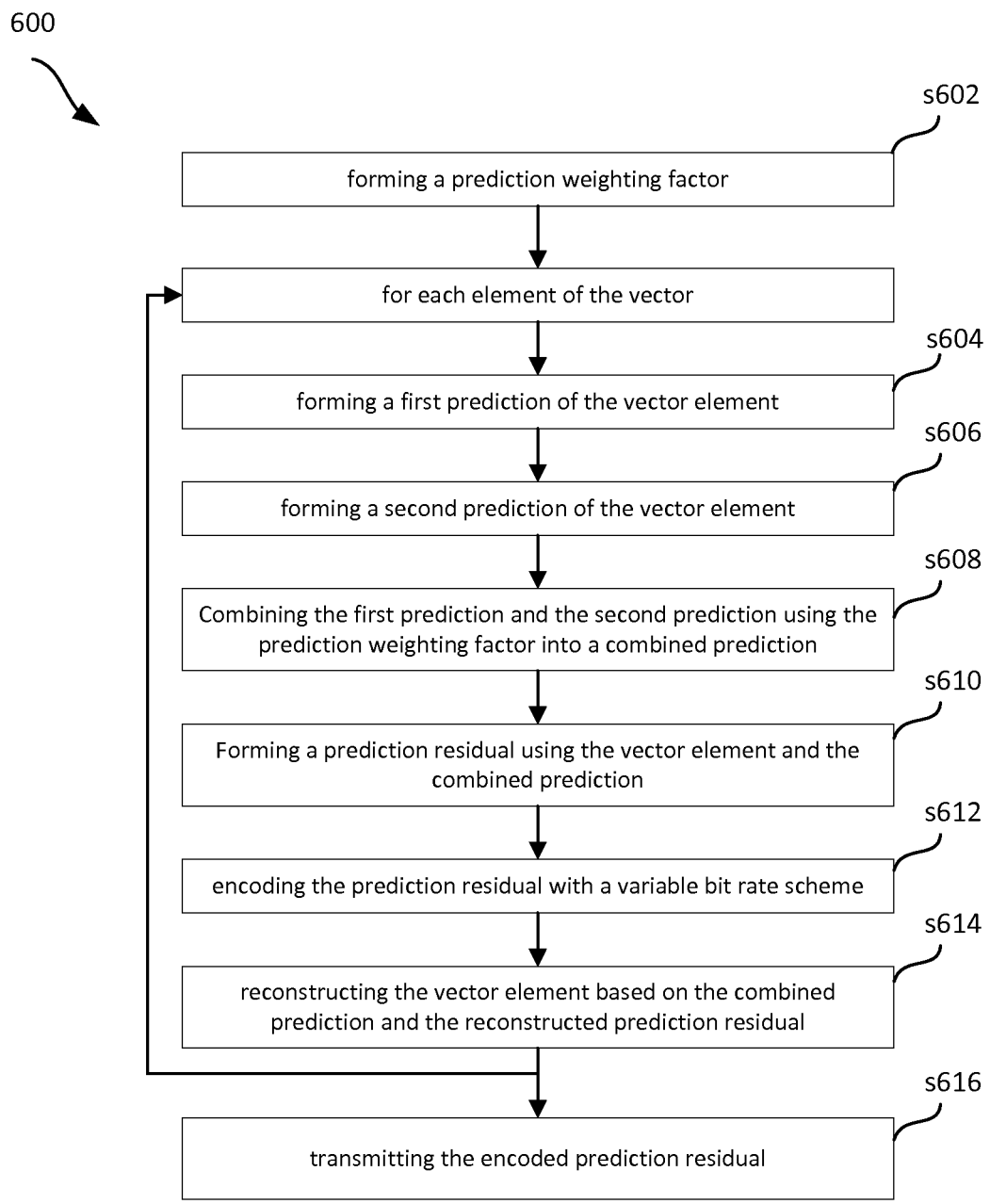
FIG. 6 is a flow chart illustrating a process according to one embodiment.

FIG. 6 is a flow chart illustrating a process 600, according to some embodiments, that is performed by an encoder 102 to encode a vector. Process 600 may begin with step 602 in which the encoder forms a prediction weighting factor. The following steps 604 through 614 may be repeated for each element of the vector. In step 606, the encoder forms a first prediction of the vector element. In step 604, the encoder forms a second prediction of the vector element. In step 608, the encoder combines said first prediction and said second prediction using the prediction weighting factor into a combined prediction. In step 610, the encoder forms a prediction residual using said vector element and said combined prediction. In step 612, the encoder encodes the prediction residual with a variable bit rate scheme. In step 614, the encoder reconstructs the vector element based on the combined prediction and a reconstructed prediction residual. In step 616, the encoder transmits the encoded prediction residual. In some embodiments, the encoder encodes also the prediction weighting factor and transmits the encoded prediction weighting factor.

In some embodiments, the first prediction is an intra-frame prediction based on the reconstructed vector elements. In such embodiments, the intra-frame prediction is formed by performing a process which includes selecting a predictor from a set of predictors, applying the selected predictor to the reconstructed vector elements; and encoding an index corresponding to the selected predictor.

In some embodiments, the second prediction is an inter-frame prediction based on one or more vectors previously reconstructed for the sequence of vectors. In such embodiments, the inter-frame prediction is formed by performing a process which may include selecting a predictor from a set of predictors, applying the selected predictor to the one or more previously reconstructed vectors, and encoding an index corresponding to the selected predictor. In embodiments, where the inter-frame prediction is based on only one previously reconstructed vector, a value from the previous reconstructed vector may be used for the inter-frame prediction, i.e., for frequency band b, a last reconstructed value (i.e. vector element) for band b may be used for an inter-frame prediction value.

In some embodiments, the process 600 includes a further step in which the prediction residual is quantized to form a first residual quantizer index, wherein the first residual quantizer index is associated with a first code word.

In some embodiments, the step of encoding the prediction residual with the variable bit rate scheme includes encoding the first residual quantizer index as a result of determining that the length of the first code word does not exceed the amount of remaining bits.

In some embodiments, the step of encoding the prediction residual with the variable bit rate scheme includes obtaining a second residual quantizer index as a result of determining that the length of the first code word exceeds the amount of remaining bits, wherein the second residual quantizer index is associated with a second code word, and wherein the length of the second code word is shorter than the length of the first code word. In such embodiments, the process 600 includes a further step in which the encoder determines whether the length of the second code word exceeds the determined amount of remaining bits.

In some embodiments, the process 600 includes a further step in which the encoder receives a first signal on a first input channel, receives a second signal on a second input channel, determines spectral characteristics of the first signal and the second signal, determines a spatial coherence based on the determined spectral characteristics of the first signal and the second signal, and determines the vector based on the spatial coherence.

In some embodiments, the process 600 is performed by the encoder in an audio encoder and decoder system comprising at least two input channels. In some embodiments, the process 600 includes a further step in which the encoder creates a spectrum by performing a process comprising transforming the input channels and analyzing the input channels in frequency bands. In some embodiments, the vector comprises a set of coherence values, and wherein each value corresponds to the coherence between two of the at least two input channels in a frequency band.

Figure 7:
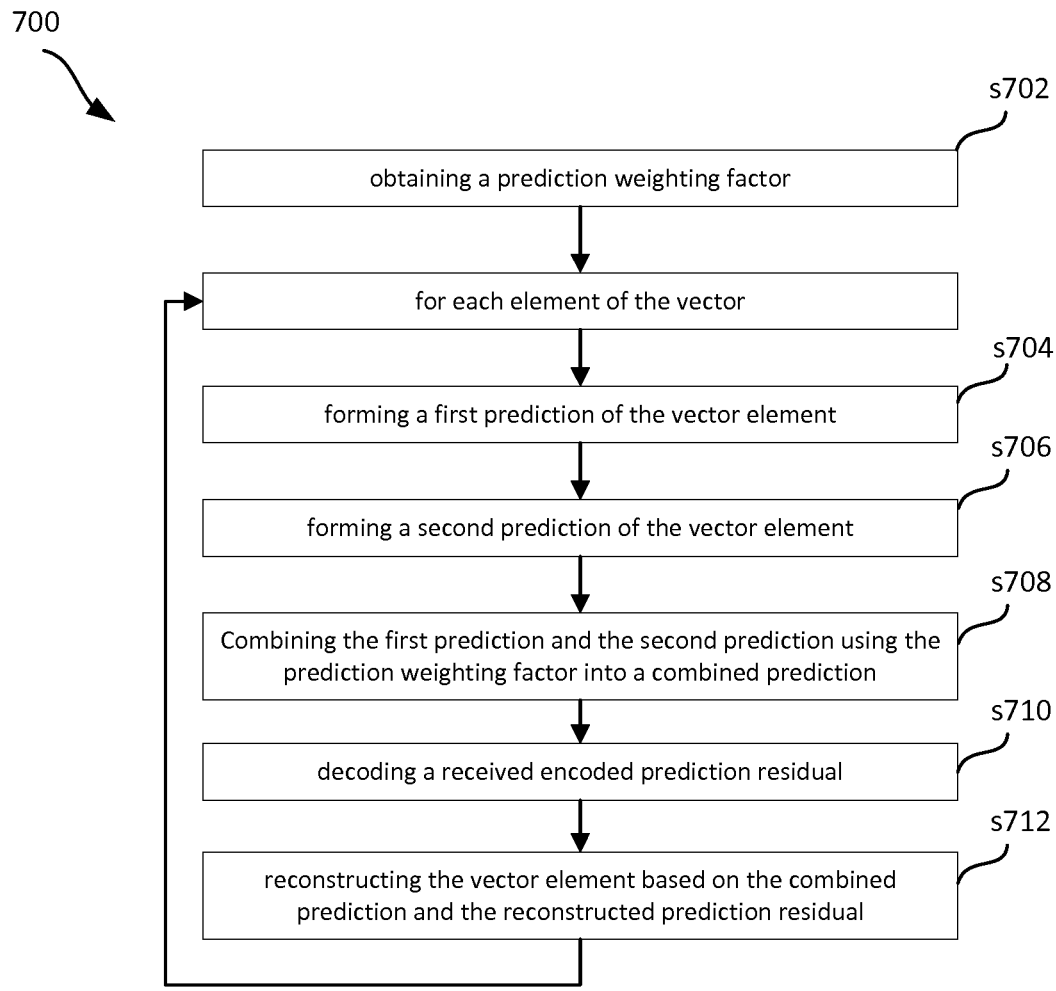
FIG. 7 is a flow chart illustrating a process according to one embodiment.

FIG. 7 is a flow chart illustrating a process 700, according to some embodiments, that is performed by a decoder 104 to decode a vector. Process 700 may begin with step 702 in which the decoder obtains a prediction weighting factor. The following steps 704 through 712 may be repeated for each element of the vector. In step 704, the decoder forms a first prediction of the vector element. In step 706, the decoder forms a second prediction of the vector element. In step 708, the decoder combines said first prediction and said second prediction using the prediction weighting factor into a combined prediction. In step 710, the decoder decodes a received encoded prediction residual. In step 712, the decoder reconstructs the vector element based on the combined prediction and the prediction residual. In some embodiments, said vector is one of a sequence of vectors.

In some embodiments, the first prediction is an intra-frame prediction based on the reconstructed vector elements. In such embodiments, the intra-frame prediction is formed by performing a process which includes receiving and decoding a predictor and applying the decoded predictor to the reconstructed vector elements.

In some embodiments, the second prediction is an inter-frame prediction based on one or more vectors previously reconstructed for the sequence of vectors. In such embodiments, the inter-frame prediction is formed by performing a process which may include receiving and decoding a predictor; and applying the decoded predictor to the one or more previously reconstructed vectors. In embodiments, where the inter-frame prediction is based on only one previously reconstructed vector, a value from the previous reconstructed vector may be used for the inter-frame prediction, i.e., for frequency band b, a last reconstructed value (i.e. vector element) for band b may be used for an inter-frame prediction value.

In some embodiments, the step of decoding the encoded prediction residual includes determining an amount of remaining bits available for decoding and determining whether decoding the encoded prediction residual exceeds the amount of remaining bits.

In some embodiments, the step of decoding the encoded prediction residual includes setting the prediction residual as zero as a result of determining that decoding the encoded prediction residual exceeds the amount of remaining bits.

In some embodiments, the step of decoding the encoded prediction residual includes deriving the prediction residual based on a residual quantizer index as a result of determining that decoding the encoded prediction residual does not exceed the amount of remaining bits, wherein the residual quantizer index is a quantization of the prediction residual.

In some embodiments, the step of obtaining the prediction weighting factor comprises (i) deriving the prediction weighting factor or (ii) receiving and decoding the prediction weighting factor.

In some embodiments, the process 700 further includes a step in which the decoder generates signals for at least two output channels based on the reconstructed vector.

Figure 8:
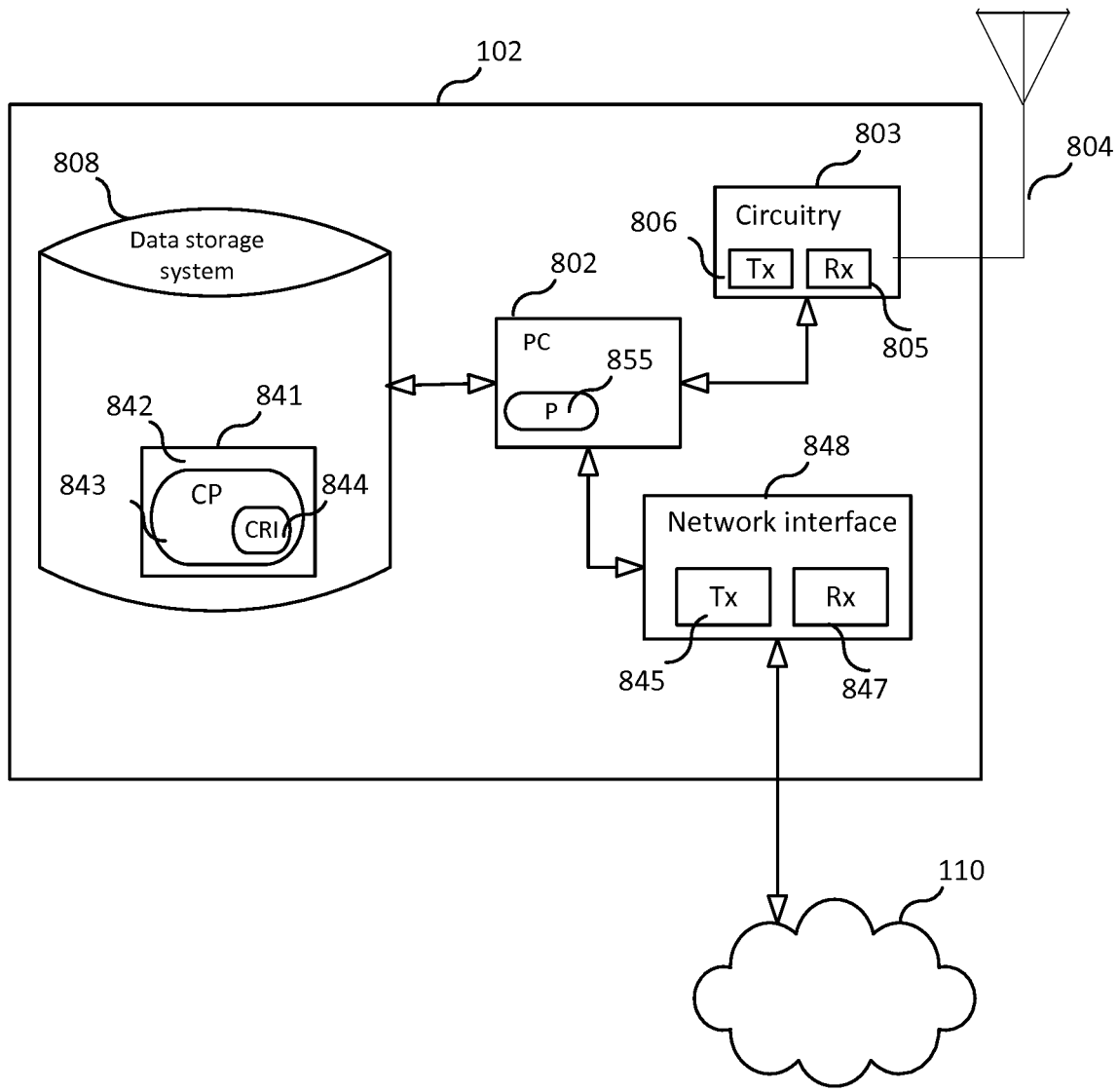
FIG. 8 is a block diagram of an encoder according to one embodiment.

FIG. 8 is a block diagram of encoder 102 according to some embodiments. As shown in FIG. 8, encoder 102 may comprise: a processing circuit (PC) 802, which may include one or more processors (P) 855 (e.g., a general purpose microprocessor and/or one or more other processors, such as an application specific integrated circuit (ASIC), field-programmable gate arrays (FPGAs), and the like); a network interface 848 comprising a transmitter (Tx) 845 and a receiver (Rx) 847 for enabling encoder 102 to transmit data to and receive data from other nodes connected to a network 110 (e.g., an Internet Protocol (IP) network) to which network interface 848 is connected; circuitry 803 (e.g., radio transceiver circuitry comprising an Rx 805 and a Tx 806) coupled to an antenna system 804 for wireless communication with UEs); and local storage unit (a.k.a., "data storage system") 808, which may include one or more non-volatile storage devices and/or one or more volatile storage devices (e.g., random access memory (RAM)). In embodiments where PC 802 includes a programmable processor, a computer program product (CPP) 841 may be provided. CPP 841 includes a computer readable medium (CRM) 842 storing a computer program (CP) 843 comprising computer readable instructions (CRI) 844. CRM 842 may be a non-transitory computer readable medium, such as, but not limited, to magnetic media (e.g., a hard disk), optical media, memory devices (e.g., random access memory, flash memory), and the like. In some embodiments, the CRI 844 of computer program 843 is configured such that when executed by data processing apparatus 802, the CRI causes encoder 102 to perform steps described herein (e.g., steps described herein with reference to the flow charts and/or message flow diagrams). In other embodiments, encoder 102 may be configured to perform steps described herein without the need for code. That is, for example, PC 802 may consist merely of one or more ASICs. Hence, the features of the embodiments described herein may be implemented in hardware and/or software.

In an embodiment an encoder 102 comprises a processing circuitry 802, the processing circuitry being configured to cause the encoder to form a prediction weighting factor, and for each element of the vector: form a first prediction of a vector element, form a second prediction of the vector element, form a prediction weighting factor, and to combine said first prediction and said second prediction using the prediction weighting factor into a combined prediction. The processing circuitry is further configured to cause the encoder to form a prediction residual using said vector element and said combined prediction, encode the prediction residual with a variable bit rate scheme and transmit the encoded prediction residual.

Figure 9:
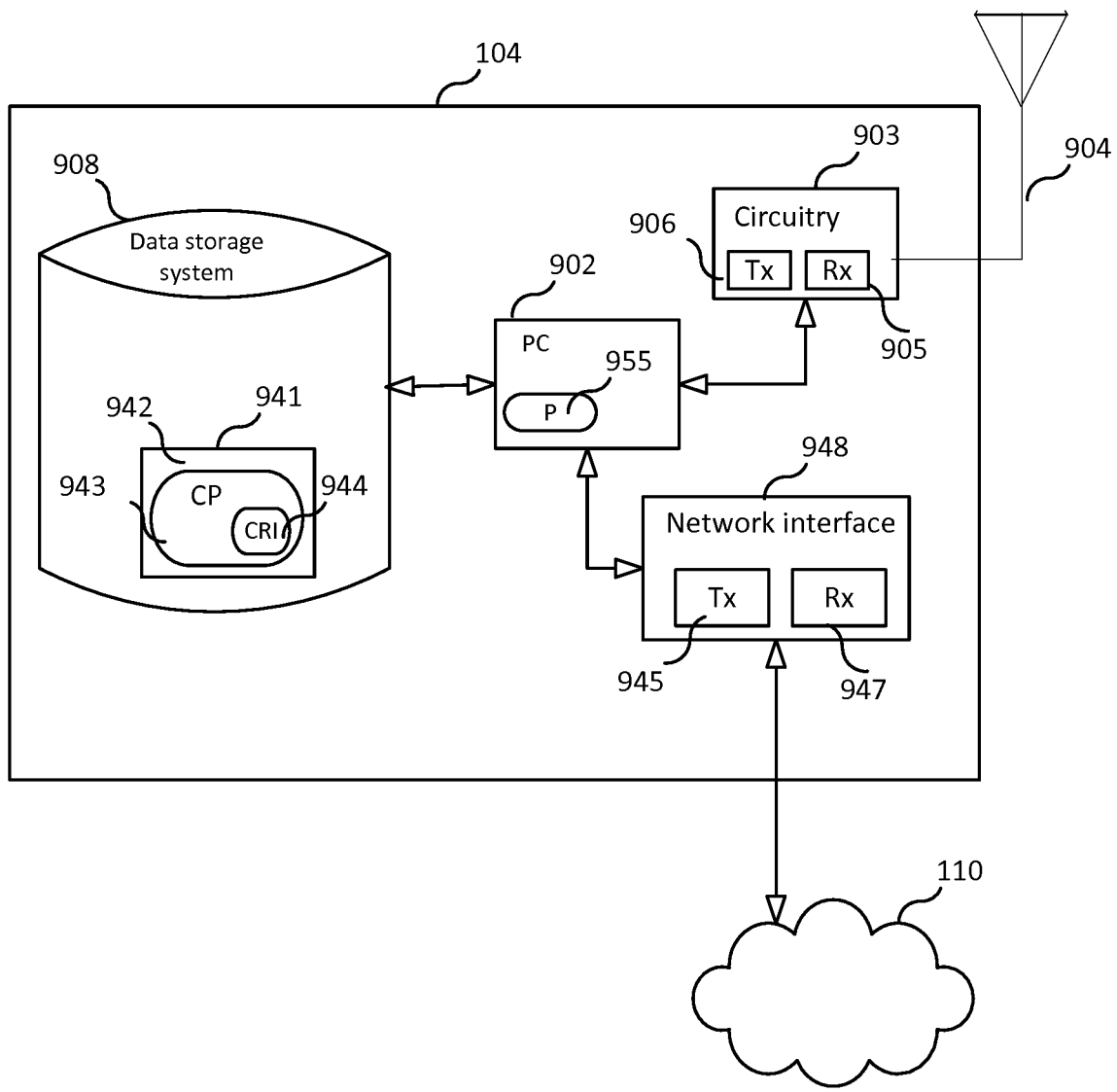
FIG. 9 is a block diagram of a decoder according to one embodiment.

FIG. 9 is a block diagram of decoder 104 according to some embodiments. As shown in FIG. 9, decoder 104 may comprise: a processing circuit (PC) 902, which may include one or more processors (P) 955 (e.g., a general purpose microprocessor and/or one or more other processors, such as an application specific integrated circuit (ASIC), field-programmable gate arrays (FPGAs), and the like); a network interface 948 comprising a transmitter (Tx) 945 and a receiver (Rx) 947 for enabling decoder 104 to transmit data to and receive data from other nodes connected to a network 110 (e.g., an Internet Protocol (IP) network) to which network interface 948 is connected; circuitry 903 (e.g., radio transceiver circuitry comprising an Rx 905 and a Tx 906) coupled to an antenna system 904 for wireless communication with UEs); and local storage unit (a.k.a., "data storage system") 908, which may include one or more non-volatile storage devices and/or one or more volatile storage devices (e.g., random access memory (RAM)). In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, but not limited, to magnetic media (e.g., a hard disk), optical media, memory devices (e.g., random access memory, flash memory), and the like. In some embodiments, the CRI 944 of computer program 943 is configured such that when executed by data processing apparatus 902, the CRI causes decoder 104 to perform steps described herein (e.g., steps described herein with reference to the flow charts and/or message flow diagrams). In other embodiments, decoder 104 may be configured to perform steps described herein without the need for code. That is, for example, PC 902 may consist merely of one or more ASICs. Hence, the features of the embodiments described herein may be implemented in hardware and/or software.

In an embodiment a decoder 104 comprises a processing circuitry 902, the processing circuitry being configured to cause the decoder to obtain a weighting factor, and for each element of the vector: form a first prediction of a vector element, form a second prediction of the vector element, obtain a prediction weighting factor and to combine said first prediction and said second prediction using the prediction weighting factor into a combined prediction. The processing circuitry is further configured to cause the decoder to decode a received encoded prediction residual and reconstruct the vector element based on the combined prediction and the decoded prediction residual.

Figure 10:
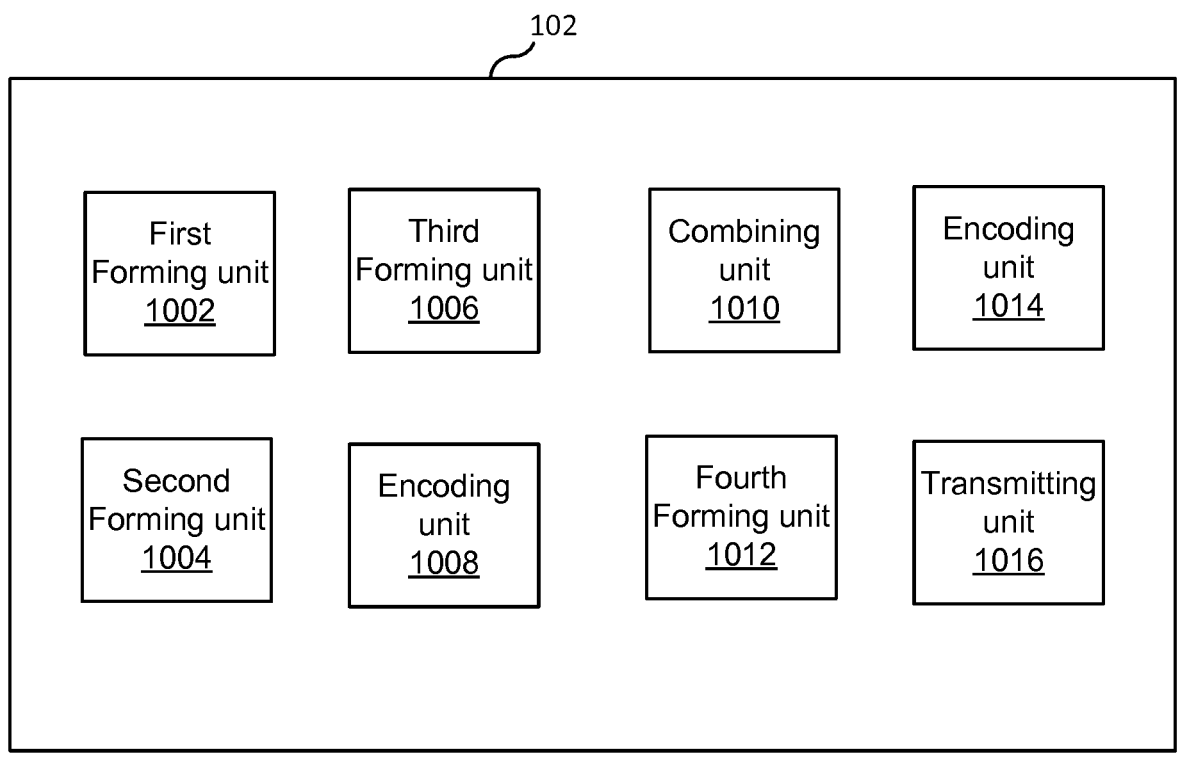
FIG. 10 is a diagram showing functional units of an encoder according to one embodiment.

FIG. 10 is a diagram showing functional units of encoder 102 according to some embodiments. As shown in FIG. 10, encoder 102 includes a first forming unit 1002 for forming a first prediction of the vector element; a second forming unit 1004 for forming a second prediction of the vector element; a third forming unit 1006 and an encoding unit 1008 for forming and encoding a prediction weighting factor; a combining unit 1010 for combining said first prediction and said second prediction using the prediction weighting factor into a combined prediction; a fourth forming unit 1012 for forming a prediction residual using said vector element and said combined prediction; an encoding unit 1014 for encoding the prediction residual with a variable bit rate scheme; and a transmitting unit 1016 for transmitting the encoded prediction weighting factor and the encoded prediction residual.

Figure 11:
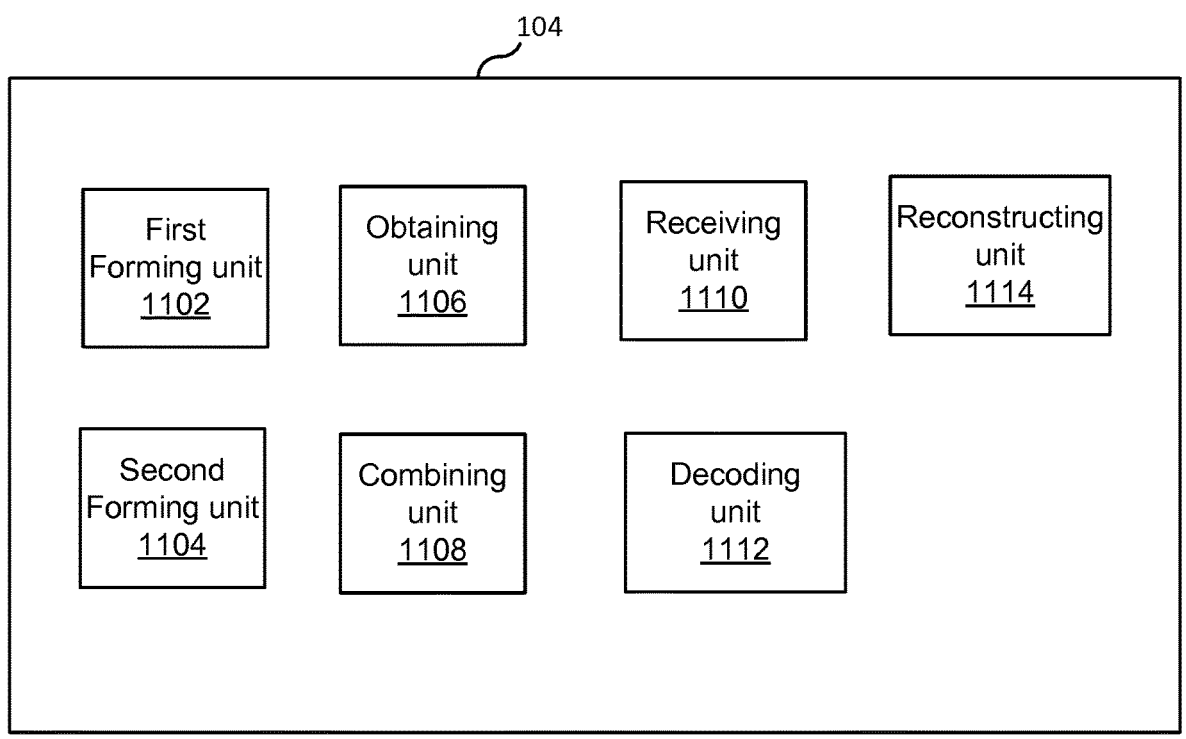
FIG. 11 is a diagram showing functional units of a decoder according to one embodiment.

FIG. 11 is a diagram showing functional units of decoder 104 according to some embodiments. As shown in FIG. 11, decoder 104 includes a first forming unit 1102 for forming a first prediction of the vector element; a second forming unit 1104 for forming a second prediction of the vector element; an obtaining unit 1106 for obtaining a prediction weighting factor; a combining unit 1108 for combining said first prediction and said second prediction using the prediction weighting factor into a combined prediction; a receiving unit 1110 and a decoding unit 1112 for receiving and decoding an encoded prediction residual; and a reconstructing unit 1114 for reconstructing the vector element based on the combined prediction and the prediction residual.

Here now follows a set of example embodiments to further describe the concepts presented herein.

A1. A method for encoding a vector, the method comprising:
 forming a first prediction of the vector;
 forming a second prediction of the vector;
 forming and encoding a prediction weighting factor;
 combining said first prediction and said second prediction using the prediction weighting factor into a combined prediction;
 forming a prediction residual using said vector and said combined prediction;
 encoding the prediction residual with a variable bit rate scheme; and
 transmitting the encoded prediction weighting factor and the encoded prediction residual.

A2. The method of embodiment A1, wherein said vector is one of a sequence of vectors.

A3. The method of embodiment A2, further comprising:
 reconstructing the vector based on the combined prediction and a reconstructed prediction residual.

A4. The method of embodiment A3, wherein the first prediction is an intra-frame prediction based on the reconstructed vector.

A5. The method of embodiment A2 or A4, wherein the second prediction is an inter-frame prediction based on one or more vectors previously reconstructed for the sequence of vectors.

A6. The method in embodiment A4, wherein the intra-frame prediction is formed by performing a process comprising:
 selecting a predictor from a set of predictors;
 applying the selected predictor to the reconstructed vector; and
 encoding an index corresponding to the selected predictor.

A7. The method in embodiment A5, wherein the inter-frame prediction is formed by performing a process comprising:
 selecting a predictor from a set of predictors;
 applying the selected predictor to the one or more previously reconstructed vectors;
 and encoding an index corresponding to the selected predictor.

A8. The method of any one of embodiments A1-A7, further comprising:
 quantizing the prediction residual to form a first residual quantizer index, wherein the first residual quantizer index is associated with a first code word.

A9. The method of embodiment A8, wherein encoding the prediction residual with the variable bit rate scheme comprises:
 determining an amount of remaining bits available for the encoding; and
 determining whether the length of the first code word exceeds the amount of remaining bits.

A10. The method of embodiment A9, wherein encoding the prediction residual with the variable bit rate scheme comprises:
 as a result of determining that the length of the first code word does not exceed the amount of remaining bits, encoding the first residual quantizer index.

A11. The method of embodiment A9, wherein encoding the prediction residual with the variable bit rate scheme comprises:

as a result of determining that the length of the first code word exceeds the amount of remaining bits, obtaining a second residual quantizer index, wherein the second residual quantizer index is associated with a second code word, and wherein the length of the second code word is shorter than the length of the first code word; and determining whether the length of the second code word exceeds the determined amount of remaining bits.

A12. The method of any one of embodiments A1-A11, further comprising:

receiving a first signal on a first input channel;

receiving a second signal on a second input channel;

determining spectral characteristics of the first signal and the second signal; determining a spatial coherence based on the determined spectral characteristics of the first signal and the second signal; and determining the vector based on the spatial coherence.

A13. The method of any one of embodiments A1-A11, wherein the method is performed in an audio encoder and decoder system comprising at least two input channels.

A14. The method of embodiment A13, the method further comprising:

creating a spectrum by performing a process comprising transforming the input channels and analyzing the input channels in frequency bands.

A15. The method of embodiment A14, wherein the vector comprises a set of coherence values, and wherein each value corresponds to the coherence between two of the at least two input channels in a frequency band.

B1. A method for decoding a vector, the method comprising:

forming a first prediction of the vector;

forming a second prediction of the vector;

obtaining a prediction weighting factor;

combining said first prediction and said second prediction using the prediction weighting factor into a combined prediction;

receiving and decoding an encoded prediction residual; and reconstructing the vector based on the combined prediction and the prediction residual.

B2. The method of embodiment B1, wherein said vector is one of a sequence of vectors.

B3. The method of embodiment B1 or B2, wherein the first prediction is an intra-frame prediction based on the reconstructed vector.

B4. The method of embodiment B2 or B3, wherein the second prediction is an inter-frame prediction based on one or more vectors previously reconstructed for the sequence of vectors.

B5. The method of embodiment B3, wherein the intra-frame prediction is formed by performing a process comprising:

receiving and decoding a predictor; and applying the decoded predictor to the reconstructed vector.

B6. The method of embodiment B4, wherein the inter-frame prediction is formed by performing a process comprising:

receiving and decoding a predictor; and applying the decoded predictor to the one or more previously reconstructed vectors.

B7. The method of any one of embodiments B1-B6, wherein decoding the encoded prediction residual further comprises:

determining an amount of remaining bits available for decoding; and determining whether decoding the encoded prediction residual exceeds the amount of remaining bits.

B8. The method of embodiment B7, wherein decoding the encoded prediction residual further comprises:

as a result of determining that decoding the encoded prediction residual exceeds the amount of remaining bits, setting the prediction residual as zero.

B9. The method of embodiment B7, wherein decoding the encoded prediction residual further comprises:

as a result of determining that decoding the encoded prediction residual does not exceed the amount of remaining bits, deriving the prediction residual based on a residual quantizer index, wherein the residual quantizer index is a quantization of the prediction residual.

B10. The method of any one of embodiments B1-B9, wherein the step of obtaining the prediction weighting factor comprises one of (i) deriving the prediction weighting factor and (ii) receiving and decoding the prediction weighting factor.

B11. The method of any one of embodiments B1-B10, further comprising:

generating signals for at least two output channels based on the reconstructed vector.

Also, while various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method, the method comprising:

obtaining a coherence vector associated with a comfort noise generation (CNG) frame of an audio signal, the coherence vector comprising a set of coherence values, wherein each coherence value is associated with a different frequency band;

encoding the coherence vector, wherein encoding the coherence vector comprises:

for each coherence value of the coherence vector:

forming a first prediction of the coherence value;

forming a second prediction of the coherence value;

combining said first prediction of the coherence value and said second prediction of the coherence value using a prediction weighting factor into a combined prediction for the coherence value;

forming a prediction residual for the coherence value using said coherence value and said combined prediction for the coherence value;

encoding the prediction residual for the coherence value with a variable bit rate scheme to produce an encoded prediction residual; and transmitting the produced encoded prediction residuals.

2. The method of claim 1, wherein said coherence vector is one of a sequence of coherence vectors.

3. The method of claim 1, further comprising:
reconstructing the coherence value based on the combined prediction and a reconstructed prediction residual.

4. The method of claim 3, wherein the first prediction is an intra-frame prediction based on the reconstructed coherence values.

5. The method of claim 4, wherein the second prediction is an inter-frame prediction based on one or more coherence vectors previously reconstructed for the sequence of coherence vectors.

6. The method of claim 4, wherein the intra-frame prediction is formed by performing a process comprising:
selecting a predictor from a set of predictors;
applying the selected predictor to the reconstructed coherence values; and
encoding an index corresponding to the selected predictor.

7. The method of claim 5, wherein a value from the previous reconstructed vector is used for the inter-frame prediction.

8. The method of claim 5, wherein the inter-frame prediction is formed by performing a process comprising:
selecting a predictor from a set of predictors;
applying the selected predictor to the one or more previously reconstructed vectors; and
encoding an index corresponding to the selected predictor.

9. The method of claim 1, further comprising:
quantizing the prediction residual to form a first residual quantizer index, wherein the first residual quantizer index is associated with a first code word.

10. The method of claim 9, wherein encoding the prediction residual with the variable bit rate scheme comprises:
determining an amount of remaining bits available for the encoding; and
determining whether the length of the first code word exceeds the amount of remaining bits.

11. The method of claim 10, wherein encoding the prediction residual with the variable bit rate scheme comprises:
as a result of determining that the length of the first code word does not exceed the amount of remaining bits, encoding the first residual quantizer index.

12. The method of claim 10, wherein encoding the prediction residual with the variable bit rate scheme comprises:
as a result of determining that the length of the first code word exceeds the amount of remaining bits, obtaining a second residual quantizer index, wherein the second residual quantizer index is associated with a second code word, and wherein the length of the second code word is shorter than the length of the first code word; and
determining whether the length of the second code word exceeds the determined amount of remaining bits.

13. The method of claim 1, further comprising:
encoding the prediction weighting factor; and
transmitting the encoded prediction weighting factor.

14. A method for decoding a coherence vector associated with a comfort noise generation (CNG) frame, the coherence vector comprising a set of coherence values, wherein each coherence value is associated with a different frequency band, the method comprising:
obtaining a prediction weighting factor; and
for each coherence value of the coherence vector:
forming a first prediction of the coherence value;
forming a second prediction of the coherence value;
combining said first prediction and said second prediction using the prediction weighting factor into a combined prediction;
decoding a received encoded prediction residual; and
reconstructing the coherence value based on the combined prediction and the decoded prediction residual.

15. The method of claim 14, wherein said coherence vector is one of a sequence of vectors.

16. The method of claim 14, wherein the first prediction is an intra-frame prediction based on the reconstructed coherence values.

17. The method of claim 15, wherein the second prediction is an inter-frame prediction based on one or more coherence vectors previously reconstructed for the sequence of coherence vectors.

18. The method of claim 16, wherein the intra-frame prediction is formed by performing a process comprising:
receiving and decoding a predictor; and
applying the decoded predictor to the reconstructed coherence values.

19. The method of claim 17, wherein a value from previous reconstructed vector is used for the inter-frame prediction.

20. The method of claim 17, wherein the inter-frame prediction is formed by performing a process comprising:
receiving and decoding a predictor; and
applying the decoded predictor to the one or more previously reconstructed coherence vectors.

21. The method of claim 14, wherein decoding the encoded prediction residual further comprises:
determining an amount of remaining bits available for decoding; and
determining whether decoding the encoded prediction residual exceeds the amount of remaining bits.

22. The method of claim 21, wherein decoding the encoded prediction residual further comprises:
as a result of determining that decoding the encoded prediction residual exceeds the amount of remaining bits, setting the prediction residual as zero.

23. The method of claim 21, wherein decoding the encoded prediction residual further comprises:
as a result of determining that decoding the encoded prediction residual does not exceed the amount of remaining bits, deriving the prediction residual based on a residual quantizer index, wherein the residual quantizer index is a quantization of the prediction residual.

24. The method of claim 14, wherein the step of obtaining the prediction weighting factor comprises one of (i) deriving the prediction weighting factor and (ii) receiving and decoding the prediction weighting factor.

25. An encoder comprising a processing circuitry, the processing circuitry being configured to cause the encoder to:
form a prediction weighting factor;
for each coherence value of a coherence vector associated with a comfort noise generation (CNG) frame, wherein each coherence value is associated with a different frequency band:
form a first prediction of a coherence value;
form a second prediction of the coherence value;
combine said first prediction and said second prediction using the prediction weighting factor into a combined prediction;
form a prediction residual using said coherence value and said combined prediction; and encode the prediction residual with a variable bit rate scheme to produce an encoded prediction residual; and transmit the encoded prediction residuals.

26. A decoder comprising a processing circuitry, the processing circuitry being configured to cause the decoder to:

obtain a prediction weighting factor; and for each coherence value of a coherence vector associated with a comfort noise generation (CNG) frame, wherein each coherence value is associated with a different frequency band:

form a first prediction of a coherence value;

form a second prediction of the coherence value;

combine said first prediction and said second prediction using the prediction weighting factor into a combined prediction;

decode a received encoded prediction residual; and reconstruct the coherence value based on the combined prediction and the decoded prediction residual.

* * * * *

UNITED STATES PATENT AND TRADEMARK OFFICE
CERTIFICATE OF CORRECTION

PATENT NO. : 11,417,348 B2
APPLICATION NO. : 17/044732
DATED : August 16, 2022
INVENTOR(S) : Norvell et al.

It is certified that error appears in the above-identified patent and that said Letters Patent is hereby corrected as shown below:

In the Specification

In Column 6, Line 5, delete "channels a" and insert -- channels to a --, therefor.

In Column 8, Line 26, delete "P(q)" and insert -- $P^{(q)}$ --, therefor.

In Column 8, Line 27, delete "(b 1)" and insert -- (b-1) --, therefor.

In Column 9, Line 65, delete "$\hat{C}_{inter,b,m}^{(q)}$," and insert -- $\hat{C}_{inter,b,m}$ , --, therefor.

In Column 9, Line 67, delete "given" and insert -- given by --, therefor.

In Column 10, Line 45, delete "steps" and insert -- step --, therefor.

In Column 10, Line 58, delete "$L_{cede}(I_{b,m}^{trunc}) > B_m - B_{curr,m}$," and insert -- $L_{code}(I_{b,m}^{trunc}) > B_m - B_{curr,m}$ --, therefor.

In Column 11, Line 1, delete "describe" and insert -- described --, therefor.

In Column 12, Line 16, delete "step 606," and insert -- step 604, --, therefor.

In Column 12, Line 17, delete "step 604," and insert -- step 606, --, therefor.

In Column 14, Line 26, delete "UEs);" and insert -- UEs; --, therefor.

In Column 15, Line 9, delete "UEs);" and insert -- UEs; --, therefor.

In Column 16, Line 48, delete "and" and insert the same at Line 47, after "vectors," as a continuation sub-point.

Signed and Sealed this
Twenty-fourth Day of October, 2023

Katherine Kelly Vidal
*Director of the United States Patent and Trademark Office*

In Column 17, Line 18, delete "determining a spatial coherence based on" and insert the same at Line 19, before "the determined" as a new sub-point.